United States Patent [19]

Tomita

[11] Patent Number: 4,593,331
[45] Date of Patent: Jun. 3, 1986

[54] TAPE PLAYER

[75] Inventor: Seiji Tomita, Yokosuka, Japan

[73] Assignee: Tokyo Shibaura Denki Kabushiki Kaisha, Kawasaki, Japan

[21] Appl. No.: 537,438

[22] Filed: Sep. 30, 1983

[30] Foreign Application Priority Data

| Oct. 1, 1982 [JP] | Japan | 57-170920 |
| Oct. 1, 1982 [JP] | Japan | 57-170921 |
| Oct. 1, 1982 [JP] | Japan | 57-170922 |
| Oct. 1, 1982 [JP] | Japan | 57-147967[U] |
| Oct. 1, 1982 [JP] | Japan | 57-147968[U] |
| Oct. 1, 1982 [JP] | Japan | 57-147969[U] |

[51] Int. Cl.[4] ............... G11B 17/00; G11B 25/06
[52] U.S. Cl. .................. 360/93; 360/96.5; 360/96.6; 360/137
[58] Field of Search ............ 360/96.1–96.6, 360/93, 137; 242/201, 200

[56] References Cited

U.S. PATENT DOCUMENTS

| 3,417,938 | 12/1968 | Markasis et al. | 360/90 X |
| 3,521,888 | 7/1970 | Kaneda | 360/93 |
| 4,303,955 | 12/1981 | Kramer et al. | 360/93 |
| 4,360,174 | 11/1982 | Tomita et al. | 242/200 |
| 4,453,189 | 6/1984 | Ida | 360/96.3 |

FOREIGN PATENT DOCUMENTS

| 0044216 | 7/1981 | European Pat. Off. . |
| 0079619 | 5/1983 | European Pat. Off. | 360/61 |
| 574005 | 6/1980 | Japan . |
| 2074365 | 10/1981 | United Kingdom . |
| 2090459 | 7/1982 | United Kingdom . |
| 0434470 | 10/1974 | U.S.S.R. | 242/201 |

Primary Examiner—A. J. Heinz
Assistant Examiner—Benjamin E. Urcia
Attorney, Agent, or Firm—Cushman, Darby & Cushman

[57] ABSTRACT

A tape player of a miniaturized size in which a tape cassette, loaded in a tape cassette receiving portion thereof, partly extends outside of a housing thereof. The tape player is provided with the housing, the tape cassette receiving portion, and a front door mounted freely rotatable at an inlet part of the tape cassette receiving portion so that when the tape cassette is not yet loaded, an end portion of the front door is urged to a position contactable with a front part of the housing, and when the tape cassette is loaded, the end portion is urged to a position allowing the entrance of the tape cassette into the cassette tape receiving portion. The rewind mode is entered by depressing a reel support spindle. The cover for the tape player is locked onto the end of one of the reel support spindles. A spring in the cover holds the tape to the heads. Aligning guides cooperate with the thickened part of the cassette tape to ensure proper tape cassette positioning. A tuner cassette may be provided so that the tape player may be employed as a radio.

19 Claims, 11 Drawing Figures

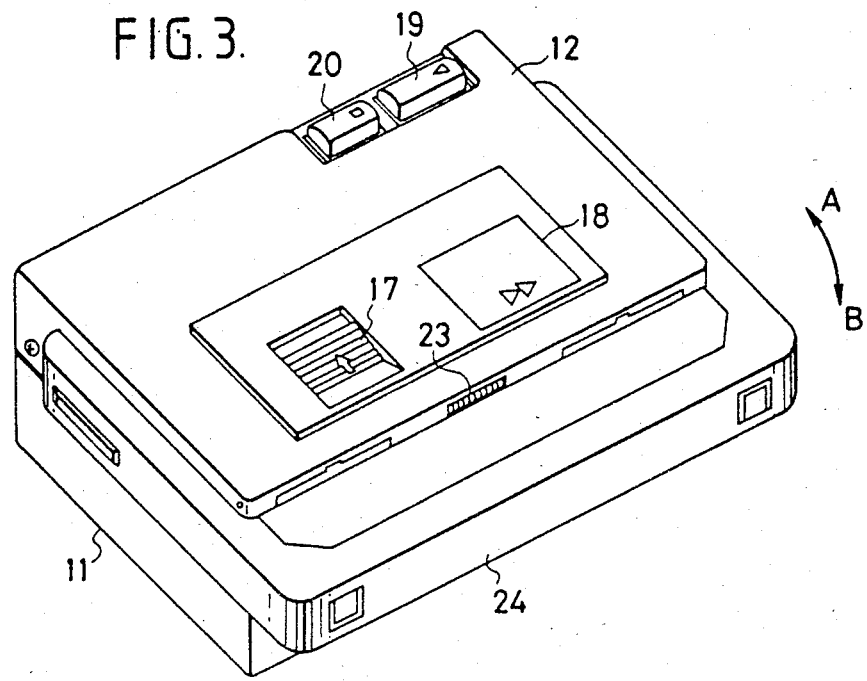
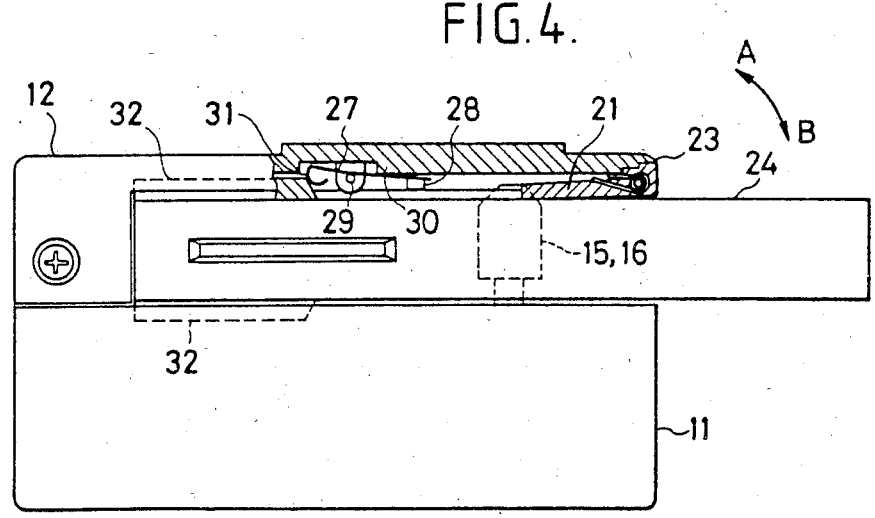

TAPE PLAYER

BACKGROUND OF THE INVENTION

1. Field of the Invention

This invention relates to a tape player, and more particularly, to a tape player for playing cartridge type tapes which utilizes a particularly compact and simple mechanism.

2. Description of the Prior Art

Recently, compact, lightweight portable type tape cassette players, utilizing a headphone, have become popular, so that a listener with a headphone can enjoy listening to a tape while, for instance, walking around. In fact, the size of these tape players is approaching the size of an ordinary case for storing cassette tapes. In order to minimize the size of the tape player, it is essential to find a better arrangement and shape for the operating buttons or keys which operate the tape player, and to improve the tape player so it is more efficient to operate.

The small size tape players heretofore developed have various shortcomings in their design and construction. For instance, the size of the tape players is not yet sufficiently small to be carried in a shirt breast pocket, and hence the tape player is ordinarily carried in a special holder. Thus, it is urgently required that the above-described shortcomings of the conventional tape players be eliminated and the size of the tape player be further reduced to such an extent that it can be carried in a shirt breast pocket.

SUMMARY OF THE INVENTION

It is, therefore, an object of the present invention to provide a tape player which is simple in construction and compact in size.

Another object of the present invention is to provide a tape player with improved operability.

A further object of the present invention is to provide a tape player in which construction is highly integrated without unnecessary parts.

According to one aspect of the present invention, there is provided a tape player in which a tape cassette is loaded in a tape cassette receiving portion in a state partly exposed to outside of a casing, and a front door is provided freely rotatably at an inlet part of said tape cassette receiving portion so that when the tape cassette is not yet loaded, an end portion of the front door is urged to a position contactable with a front part of the casing, and when the tape cassette is loaded, the end portion is urged to a position allowing the entrance of the tape cassette into the tape cassette receiving portion.

BRIEF DESCRIPTION OF THE DRAWINGS

Additional objects and advantages of the present invention will become apparent to persons skilled in the art from the following detailed description and the accompanying drawings, of which:

FIG. 3 is a perspective view of a tape player shown in FIG. 1 loaded with a tape cassette;

FIG. 4 is a side view, partly in section, of a tape player in a loaded state as shown in FIG. 3;

DESCRIPTION OF THE PREFERRED EMBODIMENT

The invention will now be described in detail with reference to the accompanying drawings.

Figure 1:
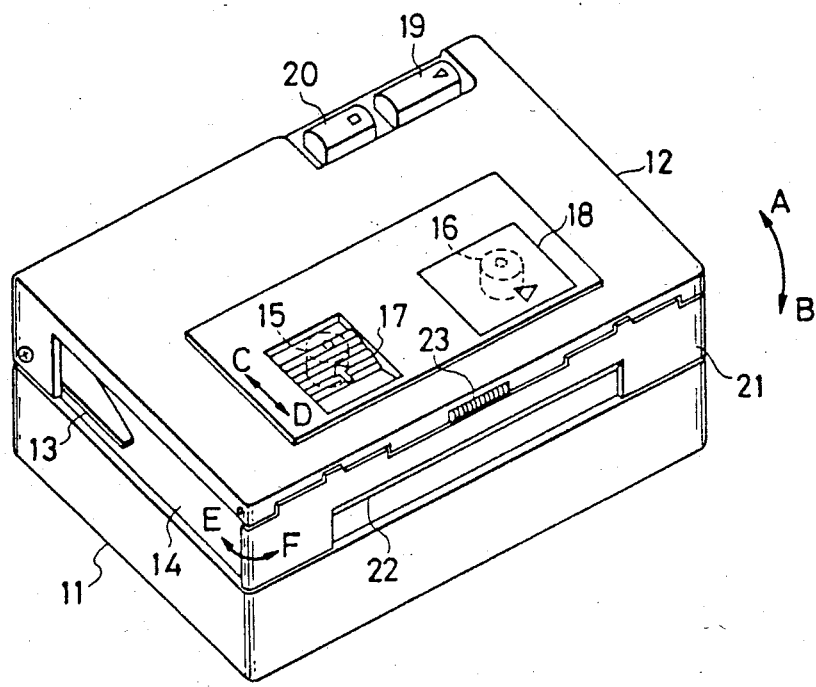
FIG. 1 is a perspective view of a tape recorder constituting an embodiment of the present invention.

FIG. 1 illustrates a general construction of a tape player constituting an embodiment of the present invention. In the embodiment, housing 11 has a box-like configurations and a size smaller than the outer periphery of a tape cassette to be loaded. One side of housing 11 is covered by cover plate 12 of an L-shaped cross-section so that when a tape cassette is received between cover plate 12 and the remainder of housing 11, the peripheral portion of the tape cassette projects outwardly from housing 11 and cover plate 12. Cover plate 12 is pivotally secured to housing 11 so that it is manually swingable in the directions of arrow marks A-B. Cover plate 12 is lightly biased in its open position, and may be locked in its closed position as will be described. Cover plate 12 is provided with tape cassette holder 13 (see FIGS. 1 and 6) which is movable in a relation interlinked with the opening and closing operation of cover plate 12.

Housing 11 is provided with tape cassette receiving portion 14 in which a part of the tape cassette is disposed when cover plate 12 is closed, and a mechanism for operating the tape player as will be described. A reproducing head and a pinch roller, which will be described, are also provided in housing 11 at positions aligned with the tape cassette so that the reproducing head and the pinch roller are movable in an interlinked relation with the opening and closing operation of cover plate 12.

In tape cassette receiving portion 14 of housing 11, there are provided a pair of reel supporting spindles 15 and 16, indicated by broken lines in FIG. 1, either one of which is operable as a tape winding spindle depending on whether the tape player is operated in a tape reproducing mode or a tape rewinding mode. Furthermore, cover locking manipulator 17 and tape rewinding manipulator 18 are provided on cover plate 12 above reel supporting spindles 15 and 16. Cover locking manipulator 17 is operable in the direction of arrow C, thereby unlocking cover plate 12 as will be described. On the other hand, tape rewinding manipulator 18 is made operable when it is depressed downwardly.

Reproduction control 19 and stop control 20, both in the form of buttons, are provided on one side of cover plate 12 at positions not overlapping the planar area occupied by the tape cassette when it is loaded, so that controls 19 and 20 can be depressed perpendicularly to the surface of cover plate 12.

Front door 21 is provided on the side of cover plate 12 opposite to tape cassette holder 13. Front door 21 is substantially flat having cut-away portion 22 at an intermediate position, and is coupled with cover plate 12 so that front door 21 is swingable in the directions of arrows E and F. Torsion spring 23 is provided between cover plate 12 and front door 21 so as to urge front door 21 perpendicularly to cover plate 12. As a consequence, when cover plate 12 is closed without loading the tape cassette, front door 21 is held perpendicularly to cover plate 12, and is interposed between cover plate 12 and housing 11 as shown in FIG. 1, thus reinforcing cover plate 12 at the corresponding end thereof.

Figure 2:
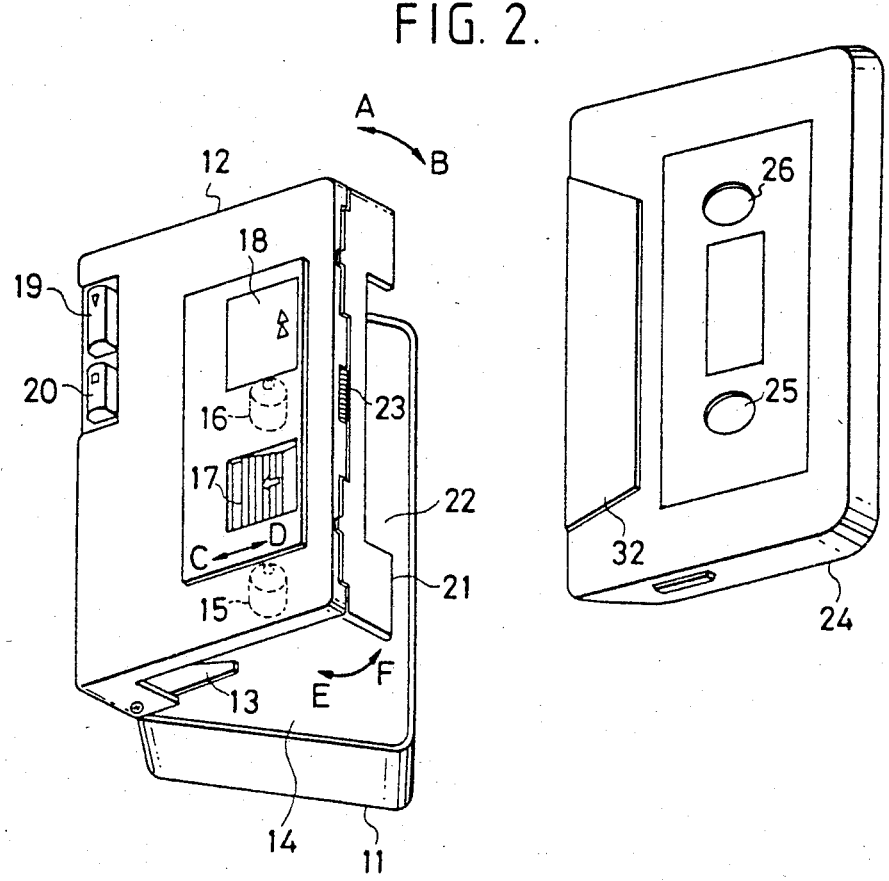
FIG. 2 is a perspective view showing a relation between the tape player shown in FIG. 1 and a tape cassette to be loaded.

When tape cassette 24 is to be loaded, cover plate 12 is swung open as shown in FIG. 2. Then the tape exposing side of tape cassette 24 is directed toward tape cassette holder 13, and tape cassette 24 is forced into tape cassette holder 13. At this time, front door 21 is rotated by the leading edge of tape cassette 24 in the direction E against the resilience of torsion spring 23, so that front door 21 is brought into a position under cover plate 12 and over the upper surface of tape cassette 24. In this state, reel hub portions 25 and 26 of cassette tape 24 are brought into cut-away portion 22 of front door 21, and when cover plate 12 is closed, reel supporting spindles 15 and 16 are forced into reel hub portions 25 and 26 through cut-away portion 22. Upon closure of cover plate 12, tape cassette 24 is loaded in cassette tape receiving portion 14 between cover plate 12 and the remainder of housing 11 as best illustrated in FIG. 3, with a peripheral portion of tape cassette 24 held outside of the tape player.

FIG. 4 illustrates in more detail housing 11 with tape cassette 24 loaded. On the internal surface of cover plate 12, leaf spring 27 is provided having a stem portion secured to securing portion 28 of cover plate 12, while an intermediate portion of leaf spring 27 is brought into engagement with projections 29 and 30 projecting internally from cover plate 12. An end of leaf spring 27 is bent, forming abutting portion 31 which, when cover plate 12 is closed, abuts against a central edge of thickened portion 32 of tape cassette 24 away from the tape exposing edge of the same (see FIG. 2). As a result, tape cassette 24 is urged by abutting end portion 31 of leaf spring 27 to ensure engagement with reel supporing spindles 15 and 16 and also the reproducing head of the tape player. That is, tape cassette 24 is firmly held in its loaded position under the resilience of leaf spring 27.

Figure 5:
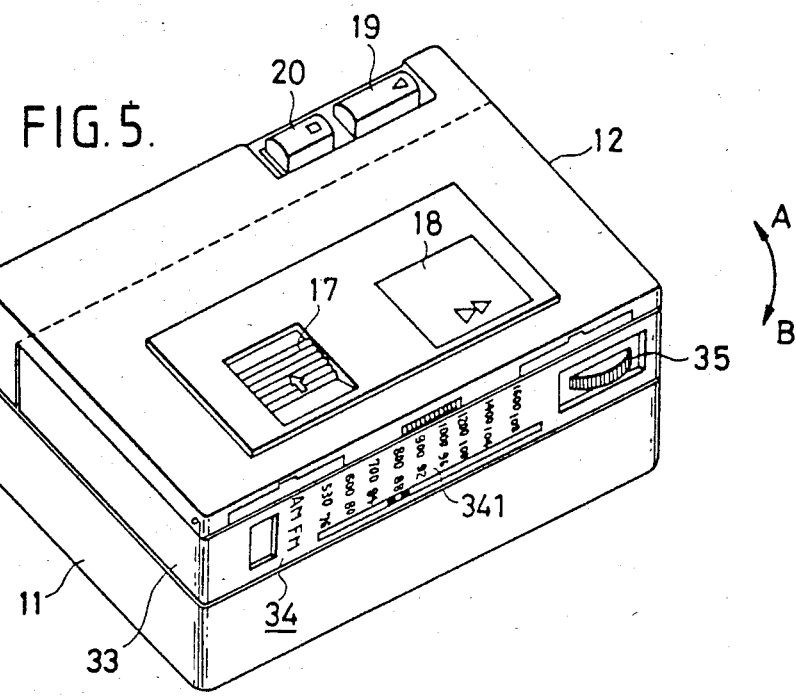
FIG. 5 is a perspective view showing a state wherein a tuner pack is loaded in a tape player shown in FIG. 1.

FIG. 5 illustrates the tape player wherein radio tuner pack 33 is inserted in the tape player of the present invention instead of cassette tape 24. In this manner, not only the play or the reproduction of tapes but also the reception of radio broadcast can be achieved by the aid of radio tuner pack 33. Radio tuner pack 33 comprises a tuner circuit for both receiving a radio wave and detecting and amplifying audio frequency signal, and a pack encasing the tuner circuit. The peripheral measurements of radio tuner pack 33 are made equal to those of housing 11. When a desired broadcasting station is to be selected, tuning dial 35 of control portion 34 inclusive of display portion 341 is manipulated. The output of the tuner circuit is introduced through connection terminals (not shown) into a main amplifier circuit of the tape player, and the amplifier output is delivered to the headphone (not shown). Since control portion 34 of radio tuner pack 33 is exposed even when cover plate 12 is closed, the operation of control portion 34 can be performed without opening cover plate 12.

As is apparent from the above description, control portion 34 is provided on one side of radio tuner pack 33 so as to be operable from outside. Since radio tuner pack 33 has certain dimensions equal to those of housing 11, control portion 34 of radio tuner pack 33 is exposed between housing 11 and cover plate 12, and manipulation from outside of control portion 34 is thereby made possible. Because of the above-described arrangement, there is no necessity of providing another control portion for radio tuner pack 33 separately in the tape player, and the construction of the tape player is thereby much simplified and the size of tape player is substantially reduced.

Figure 6:
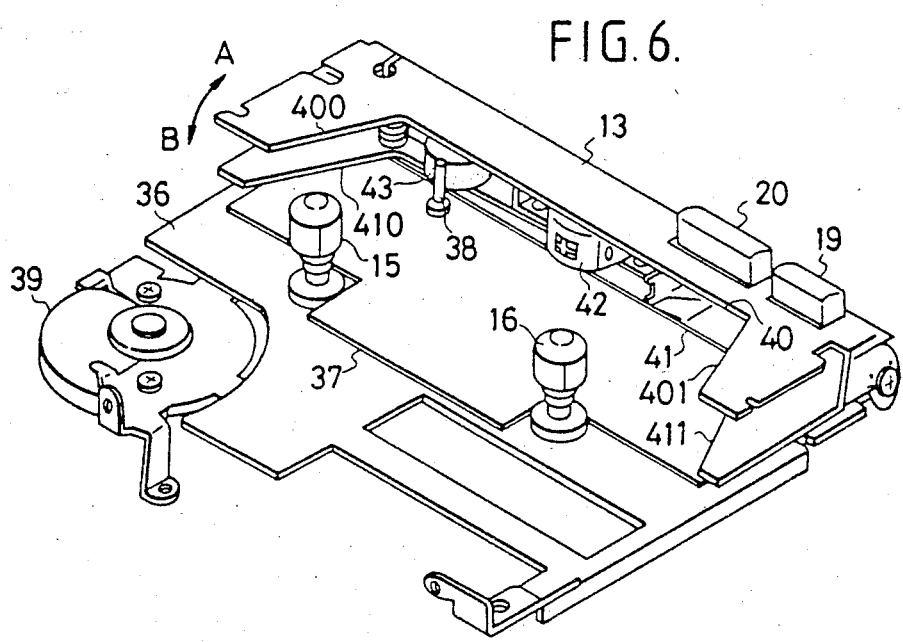
FIG. 6 is a perspective view showing a mechanism portion used in a tape player shown in FIG. 1.
Figure 7:
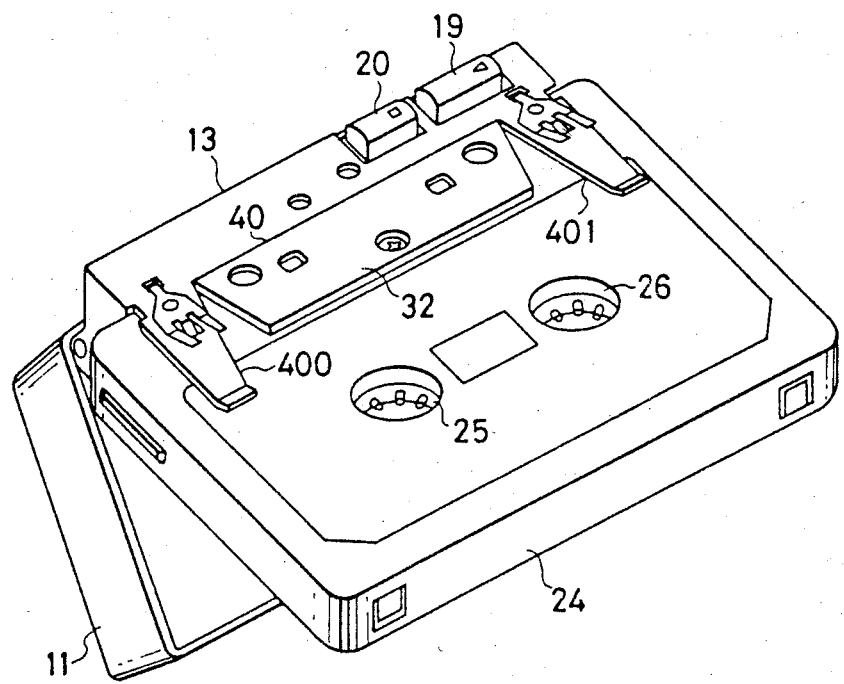
FIG. 7 is a perspective view showing a state wherein a tape cassette is inserted into a tape cassette holder.

FIG. 6 illustrates the tape player operating mechanism and tape cassette holder 13 provided on main chassis 36. Reel supporting spindles 15 and 16 project upward from main chassis 36. A substantially planar covering plate 37 extends parallel with main chassis 36 so as to cover a group of gears constituting a driving mechanism for reel supporting spindles 15 and 16. On main chassis 36, there are further provided capstan 38 operable as a rotating shaft for a hereinafter described flywheel, and electric motor 39 for rotating reel supporting spindles 15 and 16. Tape cassette holder 13 is secured to one side edge of main chassis 36 so that tape cassette holder 13 is pivotable in the directions of arrows A and B. Tape cassette holder 13 has a channel shaped cross-section having upper and lower planar portions between tape which cassette 24 is squeezed with respect to its thickness. Cut-away portions 40 and 41 are formed intermediately of the upper and lower planar portions of tape cassette holder 13 to align with thickened portion 32 of tape cassette 24. At both ends of cut-away portions 40 and 41, there are provided inclined portions 400, 401 and 410, 411 extending laterally outwardly from the bottoms of cut-away portions 40 and 41. When tape cassette 24 is inserted in tape cassette holder 13 as shown in FIG. 7, the edges of thickened portion 32 of tape cassette 24 are guided by inclined portions 400, 401 and 410, 411 of cut-away portions 40 and 41 so that tape cassette 24 is finally held at a position where the edges of thickened portion 32 on the tape exposing side of tape cassette 24 abut against the bottoms of inclined portions of cut-away portions 40 and 41.

Since cut-away portions 40 and 41 having inclined portions 400, 401 and 410, 411 are provided in tape cassette holder 13 at positions corresponding to thickened portion 32 of tape cassette 24 as described above, when tape cassette 24 is inserted into tape cassette holder 13, it is guided by inclined portions 400, 401 and 410, 411. Thickened portion 32 is held between inclined portions 400, 401 and 410, 411, so that tape cassette 24 is firmly seated at its final position defined by the bottoms of cut-away portions 40 and 41 of tape cassette holder 13.

Referring again to FIG. 6, reproducing head 42 and pinch roller 43 contactable with capstan 38 are provided within the bottom portion of channel shaped tape cassette holder 13. Furthermore, reproduction control 19 and stop control 20 are supported by tape cassette holder 13. When cover plate 12 (see FIG. 3) is placed on tape cassette holder 13, reproduction and stop controls 19 and 20, projecting upward through cover plate 12, can be manipulated from outside of cover plate 12. When cover plate 12 is opened, tape cassette holder 13 interlinked with cover plate 12 is rotated in the direction of arrow A into the opened state. During this operation, reproduction and stop controls 19 and 20, reproducing head 42, and pinch roller 43 are moved together with tape cassette holder 13.

Figure 8A:
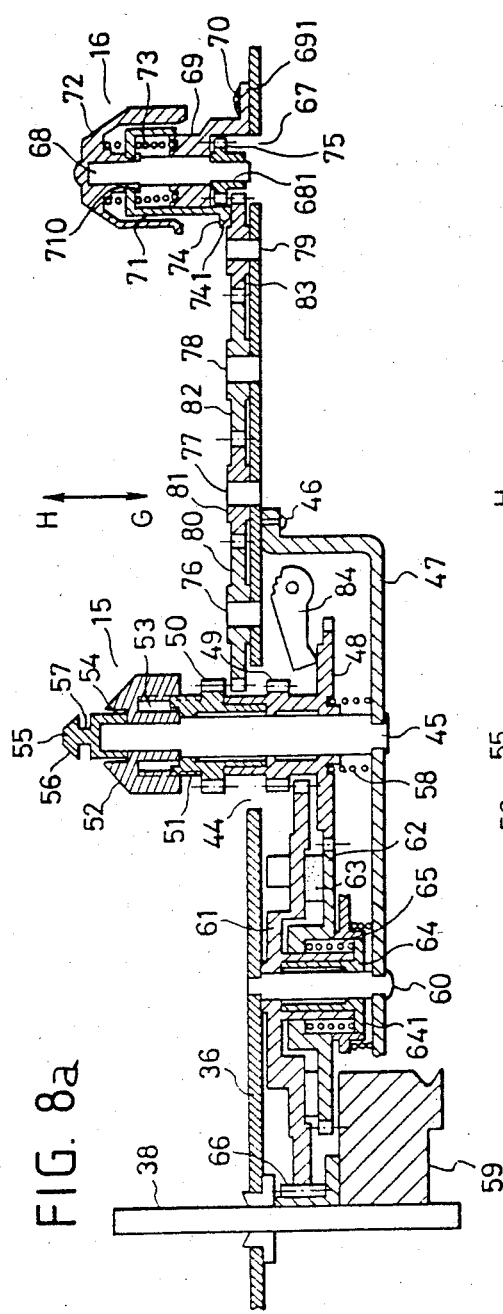
FIGS. 8(a) and 8(b) are cross-sectional views showing operational states of a driving mechanism used in a tape player shown in FIG. 1.
Figure 8B:
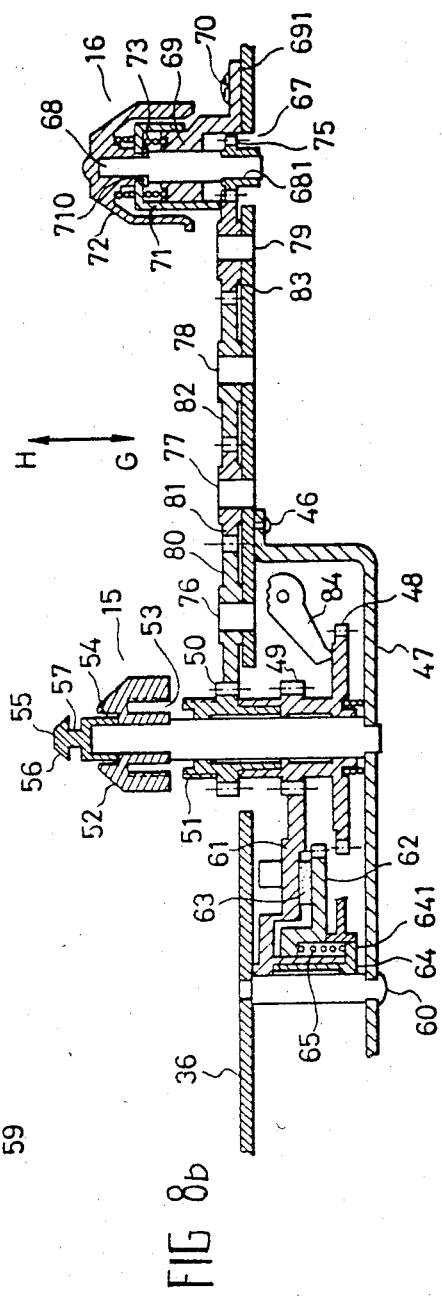

FIGS. 8(a) and 8(b) illustrate in detail the driving mechanism of the tape player operating in the reproducing and rewinding states, respectively. Reel supporting spindles 15 and 16, either one of which is operable as a tape winding spindle depending on the operating mode of the tape player, are arranged to project through main chassis 36. As shown in FIG. 8(a), reel supporting spindle 15 that is operable as a tape winding spindle in the reproduction mode of the tape player projects upward through opening 44 formed in a part of main chassis 36. Shaft 45 projecting through opening 44 has a base portion fixedly supported by supporting member 47 which extends in parallel with main chassis 36 and has one end secured to main chassis 36 by screw 46. First, second and third gears 48, 49 and 50 arranged vertically and combined into an integral piece are mounted on shaft 45 at a portion passing through opening 44 in a manner freely rotatable around shaft 45 and freely slidable therealong in the directions of arrows H and G. Among these gears, third gear 50 at the top is provided with engaging portion 51 projecting upwardly from the upper surface of third gear 50. Shaft 45 has a reduced diameter portion at a part thereof projecting upwardly from third gear 50, and reel cap 52 engageable with the reel hub of tape cassette 24 is mounted freely rotatably on the reduced diameter portion of shaft 45. Reel cap 52 is provided on its lower surface with recess 53 engageable with engaging portion 51 projecting from third gear 50, and on the upper surface of reel cap 52, there is provided recess 54 surrounding shaft 45. That is, the reduced diameter portion of shaft 45 projects upward from recess 54, and locking member 55 described hereinafter in more detail is fixed on the projecting portion of shaft 45. Flange portion 56 having peripheral surface 561 (see FIG. 10) tapered downward toward main chassis 36 is provided at the top of locking member 55, and locking groove 57 is formed around the lower part of tapered surface 561.

Coil spring 58 is inserted between the downward surface of first gear 48 and supporting member 47, so that coil spring 58 urges first, second and third gears 48, 49 and 50 in the direction of arrow H.

Another shaft 60 is fixedly mounted on main chassis 36 at a position intermediate between flywheel 59 supported by capstan 38 and reel supporting spindle 15. Fourth gear 61 having a larger diameter and fifth gear 62 having a smaller diameter are mounted on shaft 60 so that these are freely rotatable, respectively. Annular friction member 63 is interposed between fourth and fifth gears 61 and 62. Fixed member 64 is a substantially cylindrical configuration and having flange portion 641 at the lower end, is fixedly mounted on a lower part of shaft 60 as viewed in FIG. 8(a). By means of coil spring 65 inserted between flange portion 641 of fixed member 64 and fifth gear 62, fifth gear 62 is urged into engagement with fourth gear 61 through friction member 63. That is, fourth gear 61 is interlinked with fifth gear 62 through friction member 63.

Furthermore, fourth gear 61, meshing with gear 66 which cooperates with flywheel 59, is positioned between first gear 48 and second gear 49. When first, second and third gears 48, 49 and 50 are shifted in the direction of arrow G, fourth gear 61 meshes with second gear 49. In the reproducing state of the tape player, however, fifth gear 62 is engaging with first gear 48 provided for reel supporting spindle 15, and when first, second and third gears 48, 49 and 50 are shifted as described above in the direction G (tape rewinding state), fifth gear 62 is disengaged from first gear 48.

Reel supporting spindle 16 operable as a tape winding spindle in the rewinding mode of operation projects upward through another opening 67 formed in main chassis 36. Shaft 68 is rotatably provided upwardly from main chassis 36 and substantially in alignment with the central part of opening 67. The middle part of shaft 68 is supported by shaft supporting member 69 of a substantially cylindrical configuration having at a lower part thereof projecting portion 691 which is secured to main chassis 36 by screw 70. A reduced diameter portion of shaft 68 projects upwardly from shaft supporting member 69.

Locking member 71 of generally cylindrical configuration and having a bottom wall provided with through-hole 710 is rotatably mounted on the reduced diameter portion of shaft 68. Reel cap 72 is forcibly mounted on the top of the reduced diameter portion so that reel cap 72 is rotated together with shaft 68. Coil spring 73 is inserted between the upper end of shaft supporting member 69 and the bottom wall of locking member 71. Coil spring 73 urges shaft 68 in the direction of arrow H through locking member 71 and reel cap 72. Locking member 71 has, at a lower end thereof, first engaging portion 74 having tapered part 741 tapering outwardly upward from the lower end of locking member 71. The periphery of first engaging portion 74 is made larger than the diameter of opening 67 formed in main chassis 36.

Shaft 68 is further provided with reduced diameter portion 681 projecting downwardly, as viewed in the drawing, from shaft supporting member 69. Sixth gear 75 of a small diameter is fixedly mounted on reduced diameter portion 681, such that gear 75 can be rotated and shifted integrally with shaft 68.

On a part of main chassis 36 extending beteen reel supporting spindles 15 and 16, there are provided shafts 76, 77, 78 and 79 fixedly mounted on main chassis 36. Seventh, eighth, ninth and tenth gears 80, 81, 82 and 83 are rotatably mounted on shafts 76, 77, 78 and 79. In the reproducing mode of operation, seventh gear 80 adjacent to reel supporting spindle 15 is placed between second gear 49 and third gear 50. However, when rewinding manipulator 18 (see FIG. 1) is depressed (shifting the operation to the rewinding mode), seventh gear 80 is brought into engagement with third gear 50 under the action of rewinding operation actuating member 84 which depresses first gear 48 in the direction of arrow G in FIG. 8(b). Furthermore, tenth gear 83 which has been located below sixth gear 75 in reel supporting spindle 16 during the reproducing operation is brought into engagement with sixth gear 75 as shown in FIG. 8(b) upon depression of rewinding manipulator 18 (see FIG. 1).

Figure 9:
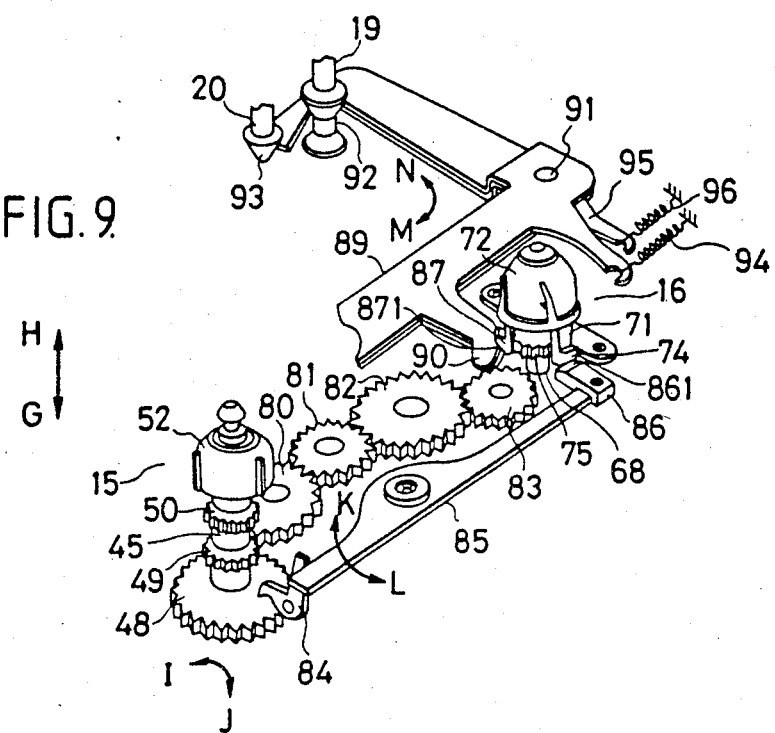
FIG. 9; is a perspective view showing a transfer drive mechanism used with the mechanism shown in FIGS. 8(a) and 8(b)

FIG. 9 illustrates a transfer mechanism for controlling the above-described tape driving system. The aforementioned tape rewinding actuation member 84 is arranged to be rotatable in the directions of arrows I and J relative to main chassis 36. Tape rewinding actuation member 84 is brought into engagement with one end of tape rewinding drive member 85, a middle part of which is pivotally secured to main chassis 36. The other end of rewinding drive member 85 is formed into driving portion 86 having tapered part 861. Tapered part 861 engages with tapered part 741 of first engaging portion 74 of locking member 71 on reel supporting spindle 16. When tape rewinding manipulator 18 (in FIG. 1) is depressed, first engaging portion 74 of locking member 71 urges driving portion 86 of tape rewinding drive member 85 to rotate in the direction of arrow K. Thus the first-mentioned end of tape rewinding drive member 85 drives rewinding actuation member 84 in the direction of arrow I, and urges first gear 48 in spindle 15 in the direction of arrow G. As a result, first, second and third gears 48, 49 and 50 integrally formed are shifted in the direction G relative to shaft 45 against the force of coil spring 58, thereby bringing third gear 50 and second gear 49 into engagement with seventh gear 80 and fourth gear 61, respectively. Sixth gear 75 fixed to shaft 68 is brought into engagement with tenth gear 83 when rewinding manipulator 18 is depressed.

As shown in FIG. 9, locking member 71 in reel supporting spindle 16 is provided with second engaging portion 87 having tapered part 871 at a position opposite to that of first engaging portion 74. Second engaging portion 87 is brought into engagement with engaging portion 90 formed on an end of locking plate 89 when reel supporting spindle 16 is depressed. Locking plate 89 is horizontally swingable around vertically disposed pivot pin 91 projecting from main chassis 36. Another end of locking plage 89 engages with driving portions 92 and 93 integrally formed with reproduction and stop controls 19 and 20, respectively.

When reproduction control 19 is depressed, driving portion 92 of reproduction control 19 rotates locking plate 89 in the direction of arrow M against the force of coil spring 94, and is locked in the depressed position by the end of locking plate 89. However, when stop control 20 is depressed in this state, driving portion 93 of stop control 20 rotates locking plate 89 in the arrowed direction M in excess of the locking position, thus unlocking driving portion 92 of reproduction control 19. Switch slider 95 is further provided on the lower surface of locking plate 89. In response to the depression of reproduction control 19, switch slider 95 on locking plate 89 turns ON a power switch (not shown) provided for operating electric motor 39 (see FIG. 6) against the force of coil spring 96, so that electric motor 39 (see FIG. 6) is thereby rotated in a predetermined condition. When stop control 20 is operated, locking plate 89 and switch slider 95 are brought into their original positions With the above-described construction, when reproduction control 19 is depressed to operate the tape player in the reproduction mode, reproducing head 42 and pinch roller 43 (in FIG. 6) are shifted to their operating positions where reproducing head 42 abuts the magnetic tape at the tape exposing side of tape cassette 24, while pinch roller 43 is urged to capstan 38 with interposition of the magnetic tape. Furthermore, locking plate 89 and switch slider 95 are rotated against the force of coil springs 94 and 96 in the arrow marked direction M as shown in FIG. 9 in response to the depression of reproduction control 19 which is locked in the depressed position by locking plate 89. At this time, switch slider 95 turns ON the power switch to operate electric motor 39 (see FIG. 6).

Electric motor 39 drives flywheel 59 in FIG. 8(a). The driving force of electric motor 39 is further transmitted through gear 66 rotated together with flywheel 59 to fourth and fifth gears 61 and 62, among which fifth gear 62 drives first gear 48. Since engaging portion 51 of third gear 50 is engaging with recess 53 of reel cap 52, the torque from first gear 48 is transmitted to reel cap 52 of reel supporting spindle 15, thus enabling to carry out the reproducing operation of the tape player.

When tape rewinding manipulator 18 is depressed, reel cap 72 on reel supporting spindle 16 is thereby depressed downwardly as viewed in FIG. 8(b), and locking member 71 is shifted against the force of coil spring 73 in the direction of arrow G. Second engaging portion 87 of locking member 71 activates switch slider 95 so as to turn ON the power switch and to operate electric motor 39 (see FIG. 6). Simultaneously, second engaging portion 87 of locking member 71 engages with engaging portion 90 of locking plate 89, thereby maintaining locking plate 89 in its operating position. By the depression of reel cap 72 of reel supporting spindle 16, shaft 68 and sixth gear 75 are moved integrally in the direction of arrow G, so that sixth gear 75 is brought into engagement with tenth gear 83. At the same time, first engaging portion 74 of locking member 71 rotates tape rewinding drive member 85 and tape operation actuating member 84 as described hereinbefore, thereby depressing first gear 48 in the direction of arrow G. Thus, first, second and third gears 48, 49 and 50 are moved integrally in the direction G relative to shaft 45, so that the engagement between engaging portion 51 projecting from third gear 50 and recess 53 of reel cap 52 is released. As a result, the torque used for rotating flywheel 59 is transmitted successively from gear 66 through fourth gear 61, second gear 49, third gear 50, seventh gear 80, eighth gear 81, ninth gear 82, tenth gear 83 to sixth gear 75, so that reel cap 72 of reel supporting spindle 16 is rotated at a rotating speed faster than that of the reproduction operation.

When a fast forward operation of the tape player is required, a fast forward manipulator (not shown) is operated to electrically disconnect a governor circuit (not shown) from electric motor 39 thereby to rotate the same at a speed much higher than the reproduction speed.

Since one of the reel supporting spindles 15 and 16 supporting reel hubs 25 and 26 of cassette 24, which is operable as a tape winding spindle during the tape rewinding operation, is thus utilized in connection with a tape rewinding manipulator to be depressed in its axial direction, wasteful parts in the construction can be eliminated, and reliable operation of the tape player is assured. Furthermore, since the transfer and driving operation in the tape rewinding mode of operation are carried out by the tape rewinding drive members cooperating with reel supporting spindles 15 and 16, the construction of the tape player is substantially simplified, and further miniaturization of the tape player is made possible.

Figure 10:
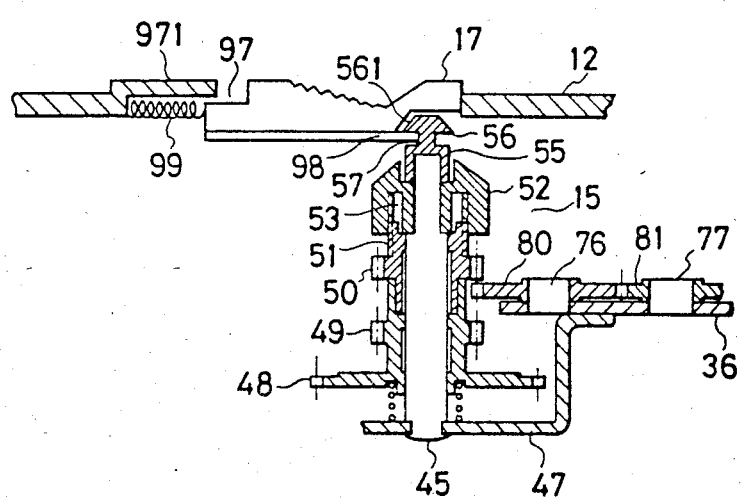
FIG. 10 is a cross-sectional view showing an important part of a locking mechanism of a cover plate used in a cassette tape player shown in FIG. 1.

FIG. 10 illustrates in detail the locking mechanism for locking cover plate 12 of the tape player in its closed position. As described above, locking member 55 is secured to the upper end of shaft 45 of the reproducing side reel supporting spindle 15. On the other hand, through-hole 97 of a substantially rectangular configuration is formed through cover plate 12 at a position opposing locking member 55. In through-hole 97, the aforementioned cover locking manipulator 17 is provided to be slidable in the directions of arrows C and D. Locking portion 98 is attached to the underside of cover locking manipulator 17, and projects from cover locking manipulator 17 to a position opposing locking groove 57 formed in locking member 55. One end of coil spring 99 is secured to an end of cover locking manipulator 17, while the other end of coil spring 99 is secured to step portion 971 formed at the other end of through-hole 97. Coil spring 99 urges cover locking manipulator 17 in the direction of arrow D relative to cover plate 12.

When cover plate 12 is to be opened from its closed state, cover locking manipulator 17 is shifted in the direction C against the force of coil spring 99. Thus, locking portion 98 projecting from cover locking manipulator 17 retracts from locking groove 57 of locking member 55 in the direction C, so that cover plate 12 is released out of the locked state. In this case, it would be advantageous that a spring member is further provided to urge cover plate 12 into its opened position relative to housing 11.

When it is desired to close cover plate 12 from its opened state, cover plate 12 is simply forced into the closed state. In this manner, the locking portion of cover locking manipulator 17 is shifted along tapered portion 561 of locking member 55 so as to be brought into engagement with locking groove 57.

Since locking member 55 is secured to the upper end of shaft 45 and is directly engageable with locking portion 98 of cover locking manipulator 17, the size of the tape player of the present invention can be reduced substantially.

Although the size of housing 11 of the tape player of the preferred embodiment is smaller than the outer periphery of tape cassette 24, the invention is not necessarily limited to such a construction. Thus, it will be apparent to those skilled in the art that various modifications and alterations may be carried out without departing from the scope of the present invention as defined in the attached claims.

What is claimed is:

1. A tape cassette transport comprising:
   a housing;
   means, disposed in said housing, for moving tape in said cassette;
   a cover pivotably attached along a first edge of said housing, said housing and said cover defining a cassette receiving space therebetween, said tape cassette extending beyond three exterior edges of said housing and said cover when inserted in said cassette receiving space;
   a door pivotably attached to a second edge of said cover opposite said first edge; and
   means for biasing said door to extend from said cover across said cassette receiving space to said housing, said door being pivoted from across said cassette receiving space when a tape cassette is inserted in said cassette receiving space.

2. A tape cassette transport as in claim 1 wherein said moving means includes two spindles for cooperating with two holes in said tape cassette, said door including a cut out area for avoiding said spindles when said door is pivoted by said tape cassette being inserted.

3. A tape cassette transport as in claim 1 further comprising a cassette holder disposed in said tape receiving space and coupled for movement with said cover.

4. A tape cassette transport as in claim 3 wherein said cassette holder includes means, adapted for cooperation with a thickened portion of said tape cassette, for positively positioning said tape cassette in said cassette holder.

5. A tape cassette transport as in claim 4 wherein said cassette holder further comprises spring means, disposed in said tape receiving space and coupled to said cover, for engaging an edge of said thickeneed portion when said tape cassette is in said cassette holder to prevent said tape cassette from withdrawing from said cassette holder.

6. A tape cassette transport as in claim 3 wherein:
   said moving means includes at least one spindle attached to said housing and having at least a rotatable portion for cooperating with a reel of said tape cassette; and
   said transport further comprises means for locking the position of said cover with respect to said housing, said locking means including a latch disposed concentrically with said spindle and engaging means, disposed on said cover for selectively engaging said latch.

7. A tape cassette transport as in claim 1 wherein said moving means includes:
   moving and actuating means, adapted for cooperation with a reel of said tape cassette, for rotating said reel, at least a first portion of said moving and actuating means being rotatable about an axis and at least a second portion of said moving and actuating means being slidable along said axis;
   means for rotating said first portion; and
   means for causing said rotating means to rotate said first portion when said second portion is slid in one direction.

8. Apparatus for transporting tape in a cassette having a thickened portion, said apparatus comprising:
   a housing defining a cassette receiving space, said cassette extending beyond three exterior edges of said housing and said cover when inserted in said cassette receiving space;
   a cassette holder disposed in said cassette receiving space;
   spring means, disposed in said cassette receiving space and coupled to said housing, for engaging an edge of said thickened portion when said tape cassetted is in said cassette holder to prevent said tape cassette from withdrawing from said cassette holder; and
   means, disposed in said housing, for moving said tape.

9. Apparatus as in claim 8 wherein said housing includes a main portion and a cover pivotably attached to said main portion, said main portion and said cover defining said cassette receiving space therebetween, said spring means being disposed on said cover.

10. Apparatus as in claim 8 wherein said thickened portion has a first edge proximate the side of said tape cassette which exposes said tape and a second edge opposite to said first edge, said spring means engaging said second edge.

11. Apparatus as in claim 8 wherein said spring means includes a curved portion, said curved portion engaging said thickened portion edge.

12. Apparatus as in claim 8 wherein said tape holder includes a slot for receiving said tape cassette, said spring means cooperating with said slot to hold said tape cassette in said holder.

13. Apparatus for transporting tape in a cassette having at least one reel, said apparatus comprising:
   a housing;
   at least one spindle attached to said housing and having at least a rotatable portion for driving with said at least one reel;

a cover pivoatably attached to said housing, said housing and said cover defining a cassette receiving space therebetween;

means for locking the position of said cover with respect to said housing, said locking means including a latch disposed on said spindle and engaging means, disposed on said cover, for selectively engaging said latch; and means for driving said rotatable portion of said spindle.

14. Apparatus as in claim 13 wherein said latch includes a tapered surface defining a groove.

15. Apparatus as in claim 13 wherein said engaging means is slidably disposed on said cover.

16. Apparatus as in claim 14 wherein said engaging means includes a locking plate slidably disposed on said cover for selectively engaging said groove.

17. Apparatus as in claim 13 wherein said locking means is disposed on a portion of said at least one spindle which does not rotate.

18. Apparatus as in claim 13 wherein said at least one spindle comprises:

moving and actuating means, adapted for cooperation with another reel of said tape cassette, for rotating said another reel, at least a first portion of said moving and actuating means being rotatable about an axis and at least a second portion of said moving and actuating means being slidable along said axis;

means for rotating said first portion; and means for causing said rotating means to rotate said first portion when said second portion is slid in one direction.

19. Apparatus as in claim 13 further comprising:

a cassette holder disposed in said receiving space and coupled for movement with said cover;

spring means, disposed in said cassette receiving space and coupled to said cover, for engaging an edge of a thickened portion of said tape cassette when said tape cassette is in cassette holder to prevent said tape cassette from withdrawing from said cassette holder.

* * * * *